United States Patent
Mino

(10) Patent No.: US 8,095,267 B2
(45) Date of Patent: Jan. 10, 2012

(54) DOOR-LOCK CONTROL SYSTEM, DOOR-LOCK CONTROL METHOD

(75) Inventor: Kosei Mino, Okazaki (JP)

(73) Assignee: Aisin Aw Co., Ltd., Aichi (JP)

( * ) Notice: Subject to any disclaimer, the term of this patent is extended or adjusted under 35 U.S.C. 154(b) by 374 days.

(21) Appl. No.: 12/388,818

(22) Filed: Feb. 19, 2009

(65) Prior Publication Data

US 2009/0248254 A1 Oct. 1, 2009

(30) Foreign Application Priority Data

Mar. 28, 2008 (JP) ................................. 2008-086486

(51) Int. Cl.
*B60R 25/00* (2006.01)
*G01C 21/26* (2006.01)
*G08G 1/09* (2006.01)

(52) U.S. Cl. .................. 701/36; 340/995.12; 340/426.1; 701/208; 701/213

(58) Field of Classification Search ............... 340/995.1, 340/995.12, 425.5, 426.1, 426.28, 426.35, 340/426.36; 701/36, 45, 49, 200, 207, 208, 701/213
See application file for complete search history.

(56) References Cited

U.S. PATENT DOCUMENTS

| 6,057,779 | A | * | 5/2000 | Bates | 340/5.21 |
| 6,384,709 | B2 | * | 5/2002 | Mellen et al. | 340/5.2 |
| 6,803,674 | B2 | * | 10/2004 | Crisp | 307/10.2 |
| 7,539,565 | B2 | | 5/2009 | McBride et al. | |
| 7,868,735 | B2 | * | 1/2011 | Nakashima et al. | 340/5.72 |
| 2004/0257208 | A1 | | 12/2004 | Huang et al. | |

FOREIGN PATENT DOCUMENTS

| JP | 2002-039762 A | 2/2002 |
| JP | 2004-143662 A | 5/2004 |
| JP | 2005-054487 A | 3/2005 |
| JP | 2008-020352 A | 1/2008 |

OTHER PUBLICATIONS

EP Search Report for EP 09 15 3218 dated Jul. 22, 2009.
Japanese Office Action for corresponding Application No. 2008-086486, issued Aug. 10, 2010.

* cited by examiner

*Primary Examiner* — Faye M Fleming
*Assistant Examiner* — Laura Freedman
(74) *Attorney, Agent, or Firm* — Lowe Hauptman Ham & Berner LLP

(57) ABSTRACT

A door-lock control system includes: a door lock device; a current position detection unit; a data recording unit; a public security situation determination processing unit; and a function setting processing unit configured to set, according to the public security situation at the vehicle position, a function limit state that limits unlocking when a door-unlock operation has been performed by an operation unit.

6 Claims, 2 Drawing Sheets

DOOR-LOCK CONTROL SYSTEM, DOOR-LOCK CONTROL METHOD

INCORPORATION BY REFERENCE

The disclosure of Japanese Patent Application No. 2008-086486 filed on Mar. 28, 2008, including the specification, drawings and abstract thereof, is incorporated herein by reference in its entirety.

BACKGROUND OF THE INVENTION

1. Field of the Invention

The present invention relates to door-lock control systems, door-lock control methods, and computer executable programs.

2. Description of the Related Art

In conventional vehicles, a plurality of doors are mounted in a freely-openable and closable way to get in and out the vehicles. A driver can lock and unlock the doors by inserting a key into a keyhole of a door and turning the key to operate a door-lock device.

A keyless entry system allows the door-lock device to be operated by a remote operation, wherein a key for the remote operation, i.e., a remote operation key, includes a lock button and an unlock button. The doors are locked by pressing the lock button, and unlocked by pressing the unlock button through an operation of the remote operation key. In addition, keyless entry systems provide the capability of operating the door-lock device without pressing the lock button or the unlock button. In this type of keyless entry system, the doors are locked and unlocked only by approaching a vehicle with the remote operation key and touching a door handle, or other portion of the vehicle, (see for example, Japanese Patent Application; Publication No. JP-A 2005-54487).

SUMMARY OF THE INVENTION

In conventional door lock devices all the doors are unilaterally locked or unlocked at the same time. Hence, if the driver unlocks the doors of the vehicle to get in the vehicle in an area where a public security is poor, while the driver opens the door on the side of a driver seat and gets in the vehicle, the other doors are likewise unlocked and may be opened. In this event, objects in the vehicle may be stolen and the driver may be harmed. Consequently, personal security is decreased when all doors are unlocked during door opening functions.

Embodiments of the present invention solve the above problems, by providing a door-lock control system, a door-lock control method, and a computer executed program that can increase security during door opening.

At least some embodiments of a door-lock control system include: a door lock device for locking and unlocking doors of a vehicle; a current position detection unit that detects a vehicle position; a data recording unit in which map data and public security information associated with the map data are recorded; a public security situation determination processing unit that reads the vehicle position detected by the current position detection unit and determines a public security situation at the vehicle position on the basis of the public security information recorded in the data recording unit; and a function setting processing unit that sets, according to the public security situation at the vehicle position, a function limit state that limits unlocking when a door-unlock operation has been performed by an operation unit.

According to at least some embodiments of the invention, the public security situation at the vehicle position is determined on the basis of the public security information recorded in the data recording unit, and the function limit state that limits unlocking when the door-unlock operation has been performed by the operation unit is set according to the public security situation at the vehicle position. Therefore, security during door opening can increase.

DETAILED DESCRIPTION OF THE PREFERRED EMBODIMENT

Embodiments of a door-lock control system include a navigation system and are herein described with reference to the drawings.

Figure 1:
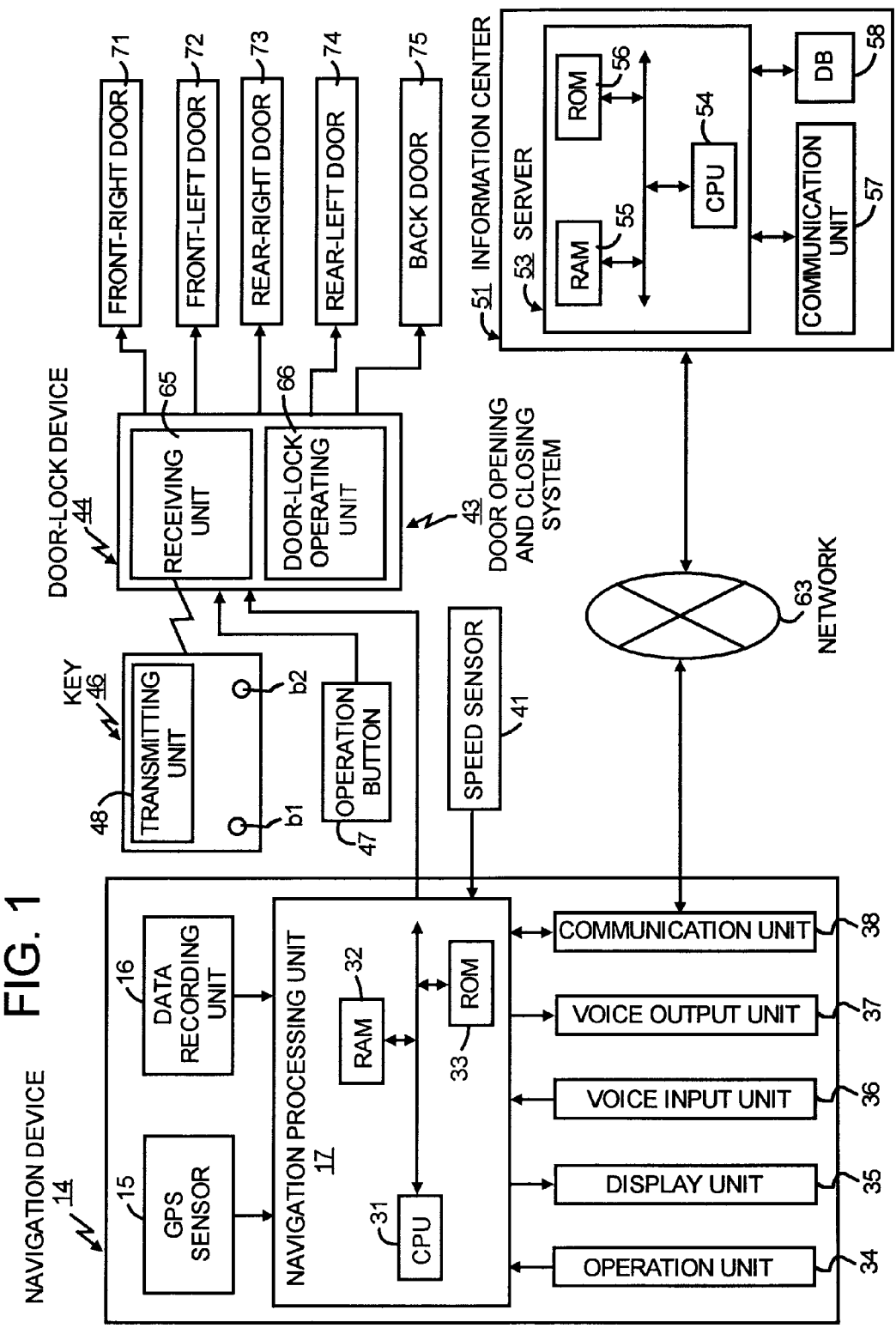
FIG. 1 is a block diagram showing a navigation system in accordance with at least one embodiment of the door-lock control system.

FIG. 1 is a block diagram showing a navigation system in accordance with at least one embodiment of the present invention.

The navigation system of FIG. 1 includes an information terminal 14, for example, a navigation device, that serves as an in-vehicle device installed in a vehicle. The system of FIG. 1 further includes a door opening and closing system 43, a communications network 63, and an information center 51 serving as an information provider. The navigation system includes the navigation device 14, the door opening and closing system 43, the network 63, the information center 51, and the like.

The navigation device 14 includes: a GPS (Global Positioning System) sensor 15 serving as a current position detection unit that detects a vehicle position and a vehicle direction; a data recording unit 16 serving as an information recording unit in which map data and various other information are recorded; a navigation processing unit 17 that performs various kinds of arithmetic processing such as navigation processing and the like based on inputted information; an operation unit 34 serving as a first input unit for performing a predetermined input through an operator executed operation; a display unit 35 serving as a first output unit for performing various kinds of display using an image displayed on a screen (not shown) to perform a notification to the driver, i.e., operator; a voice input unit 36 serving as a second input unit for performing a predetermined input by voice; a voice output unit 37 serving as a second output unit for performing various kinds of display by voice to perform a notification to the driver; and a communication unit 38 serving as a transmitting and receiving unit that functions as a communication terminal.

The GPS sensor 15, the data recoding unit 16, the operation unit 34, the display unit 35, the voice input unit 36, the voice output unit 37, and the communication unit 38 are connected to the navigation processing unit 17. Furthermore, a speed sensor 41 serving as a speed detection unit that detects a vehicle speed is connected to the navigation processing unit 17. In at least one embodiment, the vehicle direction is detected by the GPS sensor 15, however, in other embodiments, a direction sensor (not shown) serving as a direction detection unit can be independently installed so that the vehicle direction can be detected by at least the direction sensor. Still further, the GPS sensor 15 is operable to perform clock and timing functions.

Map data, statistical data, driven history data, registered point data indicating a point registered by the driver, voice data for outputting a predetermined information by the voice output unit 37, various other data such as public security information, and the like are recorded in the data recording unit 16. The map data includes node data regarding a node, road data regarding a road link, search data that has been processed for a search, intersection data regarding an intersection, facility data regarding a facility, and the like. The data is recorded in a data base installed in the data recording unit 16. The public security information is recorded associated with the map data.

In order to record the various kinds of data presented above, the data recording unit 16 includes a storage device (not shown) such as a hard disk, a CD, a DVD, an optical disk, and the like, as well as a head (not shown), such as a reading/writing head for reading and writing the various kinds of data. In some embodiments, a memory card or the like is used for the data recording unit 16.

The navigation processing unit 17 includes: a CPU 31 serving both as a control device that performs an overall control of the navigation device 14 and as an arithmetic device; a RAM 32 used by CPU 31 as a working memory to perform various kinds of arithmetic processing; a ROM 33 in which a program for control and various other programs for performing a route search to a destination, search route guidance, e.g., route guidance, are recorded; and a flash memory (not shown) that is used to record various kinds of information, including, for example, data and executable program code.

The operation unit 34 performs various functions in the navigation device 14 through a driver initiated operation. The operating unit 34 includes a remote control, a keyboard, a mouse, and the like that are installed independently of the navigation device 14, as well as a switch, a button, a key, a dial, and the like serving as operating elements by parts formed on a casing of the navigation device 14 and the like. In at least one embodiment, display unit 35 includes a LCD display. Still further, in at least one embodiment, a touch panel having a function of the operation unit can be used for the operation unit 34 and the display unit 35. In the touch panel, an image of a key, a switch, a button, or the like may be displayed on a screen, and a predetermined input operation can be performed by touching the displayed image of the key, the switch, the button.

The voice input unit 36 includes a microphone (not shown) or the like, and information can be inputted by voice. In some embodiments, the voice output unit 37 includes a voice synthesizer and a speaker, (not shown), and various kinds of information are outputted by voice from the voice output unit 37.

In at least some embodiments, communication unit 38 includes, but is not limited to, a beacon receiver, and a radio receiver. The beacon receiver receives various kinds of information, such as traffic information and general information. The information is transmitted from a road traffic information center (not shown) acting as an information provider such as a VICS (Vehicle Information and Communication System) center. The information is transmitted via a radio beacon, an optical beacon, or similar medium using a radio beacon device, an optical beacon device, or other device installed along a road. The radio receiver, i.e., communications unit 38, receives radio broadcasting, such as FM multiple broadcasting, via a radio station. The traffic information may include, but is not limited to, congestion information, regulatory information, parking information, traffic accident information, service area congestion state information, whereas the general information includes news, weather forecast, and the like.

In addition, the communication unit 38 is configured to receive various kinds of information such as traffic information and general information from the information center 51 via communications network 63. To this end, the information center 51 includes but is not limited to, a server 53, a communication unit 57 connected to the server 53, and a data base (DB) 58 serving as an information recording unit. The server 53 includes a CPU 54 serving both as a control device and as an arithmetic device, a RAM 55, and a ROM 56. In some embodiments, data base 58 includes the same data recorded in the data recording unit 16. Furthermore, in at least some embodiments, the information center 51 provides drive history data collected from a plurality of vehicles in real time.

The navigation system, navigation processing unit 17, CPUs 31 and 54, and server 53 function independently or in combinations of two or more units, and perform various kinds of processing based at least upon the stored programs and data, stored and received. A recording medium includes, but is not limited to the data recording unit 16, the RAMs 32 and 55, the ROMs 33 and 56, the data base 58, and flash memory. Further, an MPU (mobile processing unit) or other processing device can be used as an arithmetic device in place of CPUs 31 and 54.

Basic operations of the navigation system having the above structure are described below.

When operation unit 34 is first activated by the driver and the navigation device 14 is started, an initialization processing unit (not shown) of CPU 31 performs initialization processing that includes reading the vehicle position and the vehicle direction detected by the GPS sensor 15 and initializing various kinds of data. A matching processing unit (not shown) of the CPU 31 performs matching processing to locate the vehicle position by determining on which road link the vehicle position is positioned based, for example, on the track of the read vehicle position, and the shape and the arrangement of each of road links that form a road in the vicinity of the vehicle position.

Next, a basic information acquisition processing unit (not shown) of the CPU 31 performs basic information acquisition processing to acquire the map data by reading the data from the data recording unit 16 or by receiving the data from the information center 51 or the like via the communication unit 38.

A display processing unit (not shown) of the CPU 31 performs display processing to form a map screen in the display unit 35 and display the vehicle position, the map of the vicinity of the vehicle position, and the vehicle direction on the map screen. Consequently, the driver can drive the vehicle and navigate their position by monitoring the vehicle position, the map of the vicinity of the vehicle position, and the vehicle direction.

When the operator inputs a destination through an operation of the operation unit 34, a destination setting processing unit (not shown) of the CPU 31 performs destination setting processing to set a destination. Also, it is possible to set a departure point through an input if necessary. Further, it is possible to register a specified point in advance and set the registered point as the destination. Subsequently, when the operator operates the operating unit 34 to input a search condition, a route search processing unit (not shown) of the CPU 31 performs route search processing to read the vehicle position, the destination, the search condition, and the like, read the search data and the like from the data recording unit 16, search a route from the departure point represented by the vehicle position to the destination under the search condition on the basis of the vehicle position, the destination, and the search data, and output route data indicating the search route. In this case, a route in which a total of the link cost assigned to each road link is the smallest is set as the search route.

Subsequently, a guidance processing unit (not shown) of the CPU 31 performs guidance processing to perform route guidance. To this end, a route display processing unit of the guidance processing unit performs route display processing to read the route data and display the search route on the map screen according to the route data. In at least some embodiments, a voice output processing unit of the guidance processing unit is configured to perform voice output processing to perform the route guidance by outputting the search route by voice from the voice output unit 37.

Upon receiving the traffic information via the communication unit 38, the display processing unit converts the traffic information into a congestion zone as a traffic condition indicator and displays the congestion zone along a road on the map screen. In this case, the congestion zone is displayed extended from the starting point to the ending point of the congestion, and the color of the congestion zone is changed in red, orange, green, or the like according to the level of the congestion. Thus, the driver can be informed of congestion conditions of the roads, for example, in the route to be traveled by the vehicle and the search route.

A plurality of doors are mounted in the vehicle in a freely-openable and closable way to provide access in and out of the vehicles. In at least one embodiment, 5 doors are included: a front-right door 71, a front-left door 72, a rear-right door 73, a rear-left door 74, and a back-door 75. Note that a driver seat is mounted on the side of the front-right door 71 in a right-hand-drive vehicle and on the side of the front-left door 72 in a left-hand-drive vehicle. In at least one embodiment, the driver seat is mounted on the side of the front-right door 71. In addition, a keyhole (not shown) is provided near an exterior handle of the front-right door 71 and, if necessary, near an exterior handle of the front-left door 72.

Door opening and closing system 43 is configured to lock and unlock doors 71-75 and includes a door-lock device 44, a key 46 serving as a first operation unit equipped to operate the door lock device 44, and an operation button 47 serving as a second operation unit.

The key 46 includes a key part (not shown) so that the key 46 can be operated by a manual operation outside the vehicle. The door-lock device 44 includes a receiving unit 65 for receiving a remote operation signal and a door-lock operating unit 66, which is operated on the basis of the remote operation signal, for locking and unlocking the doors. Consequently, the driver can operate the door-lock operating unit 66 by inserting the key part into the keyhole and turning the key 46 outside the vehicle. When the door-lock operating unit 66 is operated, a door-lock motor (not shown) serving as a drive unit for door-lock, which is mounted in each door, is activated and a lock mechanism (not shown) is operated to lock or unlock the doors.

In a keyless entry system, key 46 can be used as a remote operation key and operated by a remote operation outside the vehicle. Accordingly, in at least some embodiments, key 46 includes a lock button b1 serving as a first operating element, an unlock button b2 serving as a second operating element, and a transmitting unit 48 for generating the remote operation signal to lock and unlock the doors and transmitting the signal to the door lock device 44.

Consequently, when the driver presses the lock button b1 outside the vehicle, the transmitting unit 48 generates the remote operation signal and transmits the signal to the door lock device 44. In the door lock device 44, the receiving unit 65 receives the remote operation signal and the door-lock operating unit 66 locks the doors according to the remote operation signal. When the driver presses the unlock button b2 outside the vehicle, the transmitting unit 48 generates the remote operation signal and transmits the signal to the door lock device 44. In the door lock device 44, the receiving unit 65 receives the remote operation signal and the door-lock operating unit 66 unlocks the doors according to the remote operation signal. In this case, the keyless entry system includes the door opening and closing system 43.

In the keyless entry system, the door-lock operating unit 66 can be operated without pressing the lock button b1 or the unlock button b2. In such a case, the transmitting unit 48 in key 46 generates the remote operation signal at all times. In the door-lock device 44, the receiving unit 65 receives the remote operation signal from the vicinity of the vehicle and transmits the signal to the door-lock operating unit 66. Then, the door-lock operating unit 66 turns to a standby state for operation of locking and unlocking the doors. If the driver, having the key 46 touches, for example, the handle serving as a third operation unit of the door from outside but in the vicinity of the vehicle, the standby operation state is cancelled and the door-lock operating unit 66 is activated to lock or unlock the doors.

In addition, the operation button 47 can be operated from inside the vehicle. To this end, the operation button 47 is mounted at a specified place of the vehicle, which in at least one embodiment, is inside the front-right door 71. When the driver presses the button, the door-lock operating unit 66 is operated and the doors can be locked or unlocked.

The driver inserts the key part into the keyhole and turns the key 46 outside the vehicle to operate the door-lock operating unit 66. In the keyless entry system, the driver presses the unlock button b2 of the key 46 or touches, for example, the handle of the door from outside but in the vicinity of the vehicle to operate the door-lock operating unit 66.

When the vehicle is located in an area of poor security, a door-unlock operation initiated by the driver may unlock all doors of the vehicle, not just the door through which the driver enters the vehicle. In such a scenario, objects in the vehicle may be stolen and the driver may be harmed by someone entering from one of the other unlocked doors.

Hence, in at least some embodiments, a function of the door-unlock feature is limited in areas of poor security. To this end, a function limit processing unit (not shown) of the CPU 31 performs function limit processing.

Figure 2:
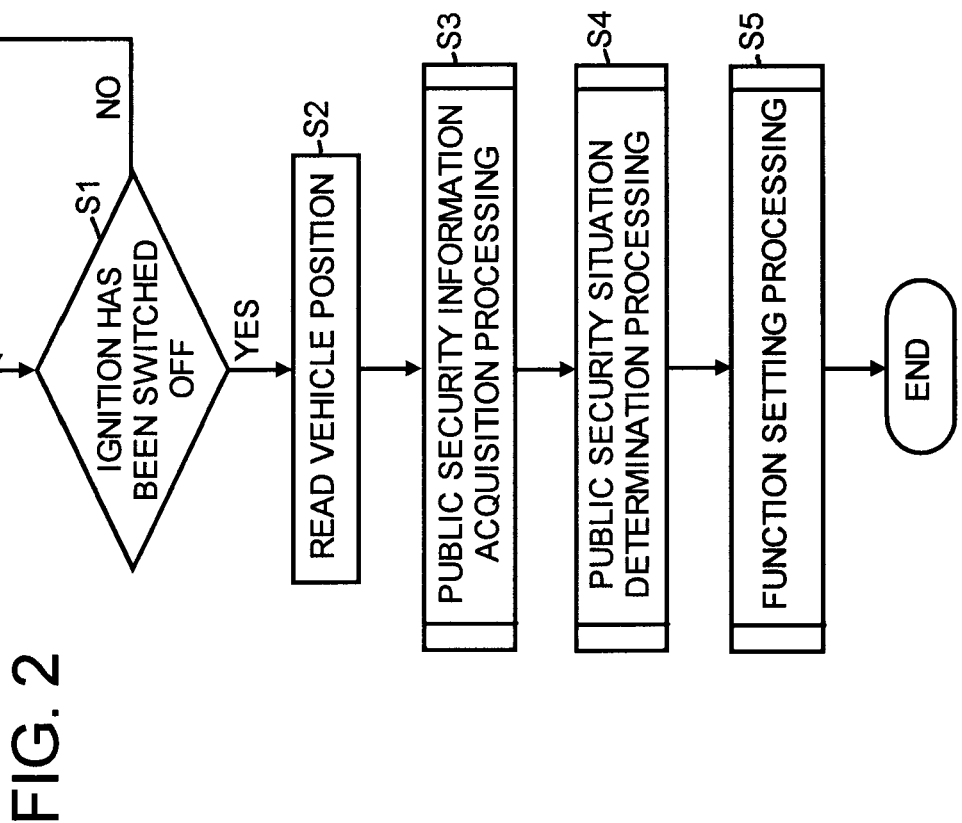
FIG. 2 is a flowchart showing an operation of a function limit processing unit in accordance with at least one embodiment of the door-lock control system.

FIG. 2 is a flowchart depicting an operation of the function limit processing unit in accordance with at least one embodiment of the present invention.

At first, a vehicle position acquisition condition determination processing unit, of the function limit processing unit, performs vehicle position acquisition condition determination processing to determine that a predetermined vehicle position acquisition condition has been met if the ignition of the vehicle has been switched off. If the ignition is switched off and the vehicle position information acquisition condition is met, a vehicle position acquisition processing unit of the function limit processing unit performs vehicle position acquisition processing to acquire the vehicle position by reading the position from the GPS sensor 15 (shown in FIG. 1).

In at least one embodiment, the vehicle position acquisition condition is met if the ignition has been switched off. However, it is possible to set that the condition is met if a parking range has been selected, if for example, the doors have been locked.

Next, if the vehicle position acquisition condition is met, a public security information acquisition processing unit of the function limit processing unit performs public security information acquisition processing to acquire the public security information by referring to the data recording unit 16. A public security situation determination processing unit of the function limit processing unit performs public security situation determination processing to determine the public security situation at the vehicle position by determining, based upon the acquired public security information, whether or not the public security in an area including the vehicle position is poor.

In the data recording unit 16, the public security situation is recorded such that the public security situation associated with the map data is set as safe or unsafe by area, e.g., an "administrative area." The "administrative area" in Japan includes, for example, "to", "do", "fu", "ken", "shi", "ku", "cho", "mura", and "gun", whereas an administrative area in the United States of America includes "state", "county", "city", "town", and "village." In the present embodiment, the public security information is recorded by administrative area. However, the public security information can be recorded by country, by section area in the map data like a mesh that is stipulated by the Geographical Survey Institute, or by road in the map data. In addition, the public security information can be changed if necessary or recorded associated with a point in registering the point. In the present embodiment, the public security information acquisition processing unit acquires the public security information by referring to the data recording unit 16. However, the public security information can be acquired also by referring to the information center 51.

Subsequently, a function setting processing unit of the function limit processing unit performs function setting processing to transmit a function limiting signal for limiting unlocking of the doors other than the front-right door 71 to the door-lock device 44 if the public security is poor at the vehicle position, and transmit a function permitting signal for permitting unlocking of all the doors to the door-lock device 44 if the public security is not poor at the vehicle position. The function limiting signal and the function permitting signal can be generated as different signals or by changing the level of one signal as a high-level or a low-level. If the vehicle position is at home, it is possible to permit unlocking of all the doors even when the public security of the area is poor.

When the function limiting signal is received in the door-lock device 44, the function setting processing unit sets a function limit state in the door-lock device 44. When the function limit state is set, if the driver makes the door-unlock operation, the door-lock operating unit 66 unlocks only the front-right door 71 and keeps the doors other than the front-right door 71 locked. When the function permitting signal is received in the door-lock device 44, the function setting processing unit sets a function permit state in the door-lock device 44. When the function permit state is set, if the driver makes the door-unlock operation, the door-lock operating unit 66 unlocks all the doors.

Thus, in at least one embodiment, if the driver unlocks the doors to get in the vehicle in the area where the public security is poor, the doors other than the front-right door 71 are kept locked. Therefore, there is no case in which the other doors are opened while the driver opens the front-right door 71 and gets in the vehicle. Consequently, security during door opening can increase.

The flowchart depicted in FIG. 2 includes steps S1-S6 and is described below.

Step S1: Waiting for the condition that an ignition is switched off. When the ignition has been switched off, proceed to Step S2.
Step S2: Reading a vehicle position.
Step S3: Performing public security information acquisition processing.
Step S4: Performing public security situation determination processing.
Step S5: Performing function setting processing and terminate the process.

In at least one embodiment, when the function limit state is set, if the driver makes the door-unlock operation, the door-lock operating unit 66 unlocks only the front-right door 71 and keeps the doors other than the front-right door 71 locked. However, when the function limit state is set, it is possible to limit unlocking of the doors by the remote operation but permit unlocking of the doors by the manual operation.

Further, it is possible to limit not only unlocking of the doors by the remote operation but also unlocking of the doors other than the front-right door 71 by the manual operation.

In addition, in at least one embodiment, the public security situation determination processing unit determines the public security situation at the vehicle position by whether or not the public security is poor. However, in other embodiments, the public security situation can be determined at a plurality of levels. In such a case, the function setting processing unit can vary setting of the function limit state according to the level of the public security situation. For example, if the public security situation is extremely poor and the level is the lowest, it is possible to limit unlocking of the doors by the remote operation and limit unlocking of the doors other than the front-right door 71 by the manual operation. If the security level is second to the lowest, it is possible to limit unlocking of the doors other than the front-right door 71 by the remote operation and the manual operation. If the level is third to the lowest, it is possible to limit unlocking of the doors other than the front-right door 71 by the remote operation and permit unlocking of the doors by the manual operation.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A door-lock control system, comprising:
    a door lock device configured to lock and unlock doors of a vehicle;
    a current position detection unit configured to detect a vehicle position;
    a data recording unit configured to have stored therein map data and public security information associated with the map data;
    a public security situation determination processing unit configured to read the vehicle position detected by the current position detection unit and to determine a level of a public security situation at the vehicle position based upon the public security information stored in the data recording unit; and
    a function setting processing unit configured to set, according to the determined level of the public security situation at the vehicle position, a function limit state that limits unlocking of at least one of the doors by a remote operation and a manual operation in different manners.

2. The door-lock control system according to claim 1, further comprising a vehicle position acquisition condition determination processing unit configured to determine whether or not a vehicle position acquisition condition for acquiring the vehicle position has been met,
wherein the public security situation determination processing unit is configured to read the vehicle position when the vehicle position acquisition condition has been met and to determine the level of the public security situation at the vehicle position.

3. The door-lock control system according claim 2, wherein the vehicle position acquisition condition determination processing unit is configured to determine that the vehicle position acquisition condition has been met if the ignition of the vehicle has been switched off.

4. A door-lock control method in a door-lock control system that includes a door lock device for locking and unlocking doors of a vehicle, a current position detection unit that detects a vehicle position, and a data recording unit in which map data and public security information associated with the map data are recorded, the door-lock control method comprising:
reading the vehicle position detected by the current position detection unit;
determining a level of a public security situation at the vehicle position on the basis of the public security information recorded in the data recording unit; and
setting, based on the determined level of the public security situation at the vehicle position, a function limit state that limits unlocking of at least one of the doors by a remote operation and a manual operation in different manners.

5. The method of claim 4, wherein the function limit state limits the unlocking of each door independently.

6. A computer-readable medium containing instructions, for a door-lock control system including a door lock device for locking and unlocking doors of a vehicle, a current position detection unit that detects a vehicle position, and a data recording unit in which map data and public security information associated with the map data are recorded, the instructions, when executed by a computer, causing the computer to execute the steps of:
reading the vehicle position detected by the current position detection unit;
determining a level of a public security situation at the vehicle position on the basis of the public security information recorded in the data recording unit; and
setting, according to the determined level of the public security situation at the vehicle position, a function limit state that limits unlocking of at least one of the doors by a remote operation and a manual operation in different manners.

* * * * *